(12) United States Patent
Formato et al.

(10) Patent No.: US 10,331,524 B2
(45) Date of Patent: Jun. 25, 2019

(54) OPTIMIZING DATA BACKUP SCHEDULES

(71) Applicant: International Business Machines Corporation, Armonk, NY (US)

(72) Inventors: Marci D. Formato, Clintondale, NY (US); Bernhard J. Klingenberg, Grover Beach, CA (US); Steven M. Reps, Sandyhook, CT (US); Kurt A. Rybczyk, Waterbury, CT (US); Lisa A. Shepard, Newtown, CT (US)

(73) Assignee: International Business Machines Corporation, Armonk, NY (US)

( * ) Notice: Subject to any disclaimer, the term of this patent is extended or adjusted under 35 U.S.C. 154(b) by 103 days.

(21) Appl. No.: 15/188,435

(22) Filed: Jun. 21, 2016

(65) Prior Publication Data
US 2017/0364415 A1    Dec. 21, 2017

(51) Int. Cl.
G06F 17/00    (2006.01)
G06F 11/14    (2006.01)

(52) U.S. Cl.
CPC ...... *G06F 11/1461* (2013.01); *G06F 11/1464* (2013.01)

(58) Field of Classification Search
CPC .............. G06F 17/30362; G06F 17/30; G06F 17/30351; G06F 11/1461; G06F 11/1464
USPC ................................................. 707/600–899
See application file for complete search history.

(56) References Cited

U.S. PATENT DOCUMENTS

| | | | |
|---|---|---|---|
| 8,260,750 B1 | 9/2012 | Gugick et al. | |
| 8,943,281 B1 | 1/2015 | Stringham | |
| 9,164,849 B2 | 10/2015 | Hari et al. | |
| 9,798,629 B1* | 10/2017 | Shilane | G06F 11/1466 |
| 2008/0154979 A1 | 6/2008 | Saitoh et al. | |
| 2013/0339302 A1 | 12/2013 | Zhang et al. | |
| 2015/0186487 A1 | 7/2015 | Karandikar | |

OTHER PUBLICATIONS

Formato et al., "Optimizing Data Backup Schedules", U.S. Appl. No. 16/200,961, Filed Nov. 27, 2018, 37 pages.
IBM Appendix P, list of patents and patent applications to be treated as related, Filed Herewith, 2 pages.

* cited by examiner

*Primary Examiner* — Isaac M Woo
(74) *Attorney, Agent, or Firm* — Bryan D. Wells

(57) ABSTRACT

Backup schedule optimization is provided. Backup environment data is identified. Data describing a first backup schedule is identified. Performance metric data that includes data for a data storage array of computer data storage device(s) of a backup server is collected. Data describing backup log(s) that associated with jobs backed up to the data storage array and respectively executed during backup window(s) is received. A target average I/O rate is determined based on the performance metric data of the data storage array. A second backup schedule is generated based on the target average I/O rate, average I/O rate(s) of the data storage array, the backup environment data, and the data describing one or more backup logs. A start time of a job is scheduled in the second backup schedule for a different time in a backup window compared to a start time of the job in the first backup schedule.

15 Claims, 6 Drawing Sheets

EXEMPLARY NON-OPTIMIZED BACKUP SCHEDULE
Backup Window: 19:00-06:00
19:00:      50 jobs start
19:30:      30 jobs complete (20 jobs running)
20:00:      28 jobs start (48 jobs running)
20:30:      15 jobs complete (33 jobs running)
21:00:      70 jobs start (103 jobs running)
21:30:      87 jobs complete (16 jobs running)
22:00:      100 jobs start (116 jobs running)
22:30:      14 jobs complete (102 jobs running)
23:00:      17 jobs start (119 jobs running)
23:30-06:00: No jobs start and all running jobs
            expected to complete by 06:00

OPTIMIZING DATA BACKUP SCHEDULES

TECHNICAL FIELD

The present invention relates generally to the field of computer data storage, and more particularly, to optimizing data backup schedules.

BACKGROUND

In information technology, the process of backing up computer data refers to copying data from a first repository to a second repository for a variety of purposes. One purpose for backing up data is to enable data recovery from the second repository in the event of data loss in the first repository. Data loss can occur via data deletion, data corruption, or the destruction of data bearing computer readable storage media as a result natural and/or man-made disasters. Another purpose for backing up data is to recover previous versions of files, computer programs, operating systems, and the like. In general, the second repository (i.e., a backup system) can include one or more types of computer readable storage media on which backups are stored. For example, magnetic tape, hard disk(s), optical storage device(s), solid-state storage media can be used alone or in any combination as part of a backup system. Additionally, the second repository can be an on-line repository, a near-line repository, or an off-line repository based on various redundancy, security, and/or accessibility requirements.

SUMMARY

According to one embodiment of the present invention, a method for optimizing data backup schedules is provided. The method includes: identifying, by one or more computer processors, backup environment data; identifying, by one or more computer processors, data describing a first backup schedule; collecting, by one or more computer processors, performance metric data that includes performance metric data of a data storage array of one or more computer data storage devices of a first backup server; identifying, by one or more computer processors, data describing one or more backup logs that are associated with a plurality of jobs that were backed up to the data storage array and respectively executed during one or more backup windows; determining, by one or more computer processors, a target average I/O rate based, at least in part, on the performance metric data of the data storage array; and generating, by one or more computer processors, a second backup schedule based, at least in part, on the target average I/O rate, one or more average I/O rates of the data storage array, the backup environment data, and the data describing the one or more backup logs such that a start time of a first job of the plurality of jobs in the second backup schedule is scheduled for a different time in a backup window compared to a start time of the first job in the first backup schedule.

According to another embodiment of the present invention, a computer program product for optimizing data backup schedules is provided. The computer program product comprises a computer readable storage medium and program instructions stored on the computer readable storage medium. The program instructions include: program instructions to identify backup environment data; program instructions to identify data describing a first backup schedule; program instructions to collect performance metric data that includes performance metric data of a data storage array of one or more computer data storage devices of a first backup server; program instructions to identify data describing one or more backup logs that are associated with a plurality of jobs that were backed up to the data storage array and respectively executed during one or more backup windows; program instructions to determine a target average I/O rate based, at least in part, on the performance metric data of the data storage array; and program instructions to generate a second backup schedule based, at least in part, on the target average I/O rate, one or more average I/O rates of the data storage array, the backup environment data, and the data describing the one or more backup logs such that a start time of a first job of the plurality of jobs in the second backup schedule is scheduled for a different time in a backup window compared to a start time of the first job in the first backup schedule.

According to another embodiment of the present invention, a computer system for optimizing data backup schedules is provided. The computer system includes one or more computer processors, one or more computer readable storage media, and program instructions stored on the computer readable storage media for execution by at least one of the one or more processors. The program instructions include: program instructions to identify backup environment data; program instructions to identify data describing a first backup schedule; program instructions to collect performance metric data that includes performance metric data of a data storage array of one or more computer data storage devices of a first backup server; program instructions to identify data describing one or more backup logs that are associated with a plurality of jobs that were backed up to the data storage array and respectively executed during one or more backup windows; program instructions to determine a target average I/O rate based, at least in part, on the performance metric data of the data storage array; and program instructions to generate a second backup schedule based, at least in part, on the target average I/O rate, one or more average I/O rates of the data storage array, the backup environment data, and the data describing the one or more backup logs such that a start time of a first job of the plurality of jobs in the second backup schedule is scheduled for a different time in a backup window compared to a start time of the first job in the first backup schedule.

DETAILED DESCRIPTION

Embodiments of the present invention recognize that, in general, implementing a backup schedule that produces a balanced backup server workload over the course of a backup window is advantageous. Achieving a balanced backup server workload, however, can require consideration of a variety of factors. Such factors can include any combination of network throughput, storage media input/output (I/O) metrics, storage pool size, backup window length, a count of backup clients, and various factors relating to individual backup jobs. Factors relating to an individual backup job can include an amount of data, an anticipated job duration, and a job type (e.g., a backup of an operating system as opposed to a database). In particular, embodiments of the present invention recognize that a backup system utilizing multiple types of computer readable storage media (i.e., a heterogeneous backup system) can substantially increase the complexity and difficulty associated with creating a balanced backup server workload due to I/O characteristics of different types of computer readable storage media.

Embodiments of the present invention provide backup schedules that result in one or both of a reduction in over-utilization of a backup server and a reduction in under-utilization of the backup server over a duration of a backup window. Reducing a count of periods of over-utilization and/or a count of periods of under-utilization advantageously results in a more balanced backup server workload over the duration of the backup window (i.e., an optimized backup server workload) and increase the likelihood that all scheduled backups will complete within a defined backup window. Some embodiments of the present invention provide, to backup system administrators, recommendations for optimizing backup server workloads. Other embodiments of the present invention automatically reschedules backup jobs, as described herein, to provide an optimized backup server workload.

Figure 1:
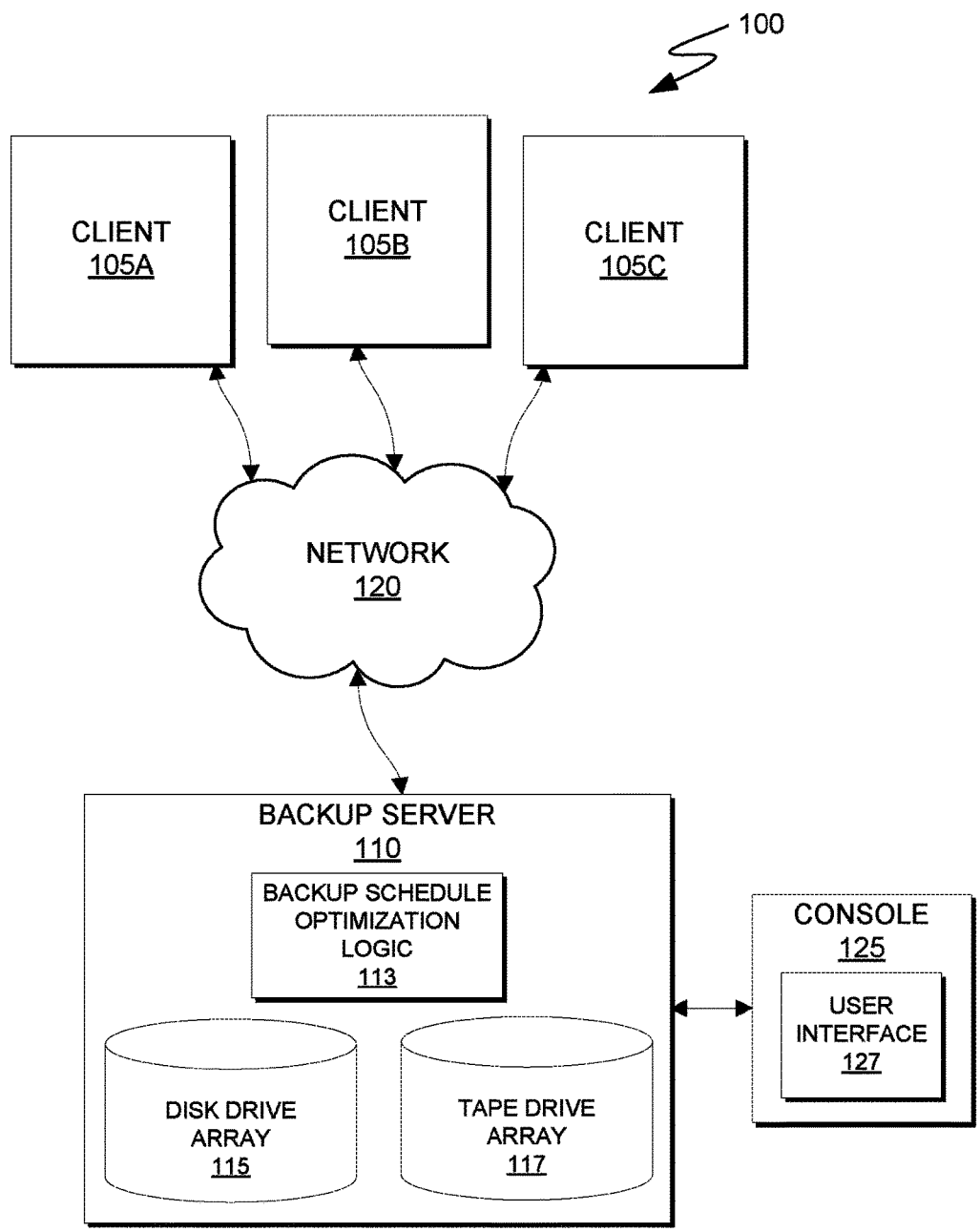
FIG. 1 is a functional block diagram illustrating a backup environment, in accordance with an embodiment of the present invention.

Embodiments of the present invention will now be described in detail with reference to the figures. FIG. 1 is a functional block diagram illustrating a backup environment, in accordance with an embodiment of the present invention. For example, FIG. 1 is a functional block diagram illustrating backup environment 100. Backup environment 100 includes client device 105A, client device 105B, client device 105C, and backup server 110. Client device 105A, client device 105B, and client device 105C (collectively referred to as client devices 105) are communicatively connected to backup server 110 by network 120. In the embodiment depicted in FIG. 1, backup server 110 is communicatively connected to console 125 and backup server 110 includes backup optimization logic 113, disk drive array 115, and tape drive array 117.

In various embodiments, each of client device 105A, client device 105B, and client device 105C is a computing device that can be a standalone device, a server, a laptop computer, a tablet computer, a netbook computer, a personal computer (PC), or a desktop computer. In another embodiment, one or more of client device 105A, client device 105B, and client device 105C represents a computing system utilizing clustered computers and components to act as a single pool of seamless resources. In general, each of client device 105A, client device 105B, and client device 105C can be any computing device or a combination of devices with access to backup server 110 and capable of transmitting information (i.e., data) to backup server 110 via network 120 in accordance with a backup schedule that is based, at least in part, on one or more recommendations provided by backup schedule optimization logic 113 executing on backup server 110. In the embodiment depicted in FIG. 1, client devices 105 comprise three client devices. In other embodiments, however, client devices 105 can comprise a greater or lesser count of client devices. In yet other embodiments, the count of client devices comprising client devices 105 can change over time without departing from the scope of the present invention. Additionally, each client device of client devices 105 can include internal and external hardware components, as depicted and described in further detail with respect to FIG. 4.

Network 120 can be, for example, a local area network (LAN), a wide area network (WAN) such as the Internet, or a combination of the two, and can include wired, wireless, fiber optic or any other connection known in the art. In general, network 120 can be any combination of connections and protocols that will support respective communications between each client device of client devices 105 and backup server 110, in accordance with various embodiments of the present invention.

Backup server 110 is a computing device that can be a standalone device, a server, a laptop computer, a tablet computer, a netbook computer, a personal computer (PC), a desktop computer, a personal digital assistant (PDA), a smart phone, or any programmable electronic device capable of communicating with client devices 105 via network 120. In another embodiment, backup server 110 represents a computing system utilizing clustered computers and components to act as a single pool of seamless resources. In general, backup server 110 can be any computing device or a combination of devices with access to client devices 105 and one or more data repositories (e.g., disk drive array 115 and/or tape drive array 117) and that is capable of executing or being managed by an instance of backup schedule optimization logic 113. Additionally, backup server 110 can include internal and external hardware components, as depicted and described in further detail with respect to FIG. 4. In some embodiments of the present invention, backup environment 100 includes multiple backup servers (e.g., multiple instances of backup server 110 used as repositories for backups when off-loading and on-loading jobs among the backup servers, as described herein) that are communicatively connected over a network, such as network 120, as described herein.

In embodiments like the embodiment depicted in FIG. 1, backup schedule optimization logic 113 is stored and executes on backup server 110. In other embodiments, backup schedule optimization logic 113 resides on another computing device (e.g., console 125), provided that backup schedule optimization logic 113 can access data on backup server 110 in order to identify one or more backup jobs for rescheduling, as described herein. In yet other embodiments, backup schedule optimization logic 113 can be stored externally and accessed through a communication network, such as network 120, provided that backup schedule optimization logic 113 can similarly access data on backup server 110.

In general, backup schedule optimization logic 113 operates to reschedule jobs (i.e., "backup jobs") on backup server 110 such that continual throughput is achieved during one or more backup windows. As described herein, backup schedule optimization logic 113 reschedules jobs based, at least in part, on backup schedules and backup logs that reside on backup server 110 (and/or information provided by a user of console 125) and I/O performance metrics of various component(s) of backup server 110 (e.g., disk drive array 115, tape drive array 117, network adapter(s), processor(s), or memories of backup server 110). In embodiments that include a plurality of backup servers (i.e., multiple instances of backup server 110), one or more instances of backup schedule optimization logic 113 execute within backup environment 100 to facilitate rescheduling jobs across the plurality of backup servers (i.e., repositories for backups).

As described herein, Backup schedule optimization logic 113 can provide, to a backup system administrator who is tasked with managing a backup schedule on backup server 110, backup scheduling reports and/or recommendation(s) to reschedule one or more jobs via console 125 and/or automatically reschedule one or more jobs without human involvement. In some embodiments, console 125 is a system console including one or more input devices (e.g., a keyboard, a mouse, a touchpad, or touchscreen) and one or more displays that are physically integrated with backup server 110. In other embodiments, console 125 is a virtual console that a user of console 125 interacts with via a separate computing device (i.e., a computing device other than backup server 110 that includes internal and external hardware components, as depicted and described in further detail with respect to FIG. 4) that is communicatively connected to backup server 110 (e.g., via network 120, a local area network, or a peer-to-peer connection). For example, in an embodiment of backup environment 100 that includes a plurality of backup servers (i.e., multiple instances of backup server 110), console 125 is provided as a separate computing device that is communicatively connected to each backup server and that executes or has access to an instance of backup schedule optimization logic 113; from console 125, a backup system administrator can manage backup schedules on each of the backup servers to facilitate rescheduling jobs among the plurality of backup servers.

In general, console 125 represents various features of one or more computing devices that execute user interface 127, which operates to provide a user interface for managing a backup schedule on backup server 110. User interface 127 further operates to receive user input from a user (e.g., a backup system administrator tasked with managing backup server 110) via the provided user interface, thereby enabling the user to interact with backup schedule optimization logic 113. In some embodiments, backup server 110 stores and executes user interface 127 to provide the functionality attributed to console 125. In other embodiments, a computing device other than backup server 110 stores and executes user interface 127, provided that user interface 127 can access and is accessible by backup schedule optimization logic 113 to provide the functionality attributed to console 125.

Disk drive array 115 is a data repository that is managed, at least in part, by backup schedule optimization logic 113. In the embodiment depicted in FIG. 1, disk drive array 115 represents one or more logical volumes, each logical volume comprising one or more hard disk drives on which backup server 110 backs up data from one or more of client devices 105. In some embodiments, backup server 110 includes a plurality of disk drive arrays (i.e., multiple instances of disk drive array 115) based on performance, redundancy, and/or security requirements associated with client devices 105, as will be understood by persons having ordinary skill in the art. Similarly, tape drive array 117 is a data repository that is managed, at least in part, by backup schedule optimization logic 113. In the embodiment depicted in FIG. 1, tape drive array 117 represents one or more logical volumes, each logical volume comprising one or more tape drives on which backup server 110 backs up data from one or more of client devices 105. In some embodiments, backup server 110 includes a plurality of tape drive arrays (i.e., multiple instances of tape drive array 117) based on performance, redundancy, and/or security requirements associated with client devices 105, as will be understood by persons having ordinary skill in the art.

In general, backup server 110 includes one or more types of data storage devices that provide one or more logical volumes in which backup server 110 backs up data from client devices 105. For example, backup server 110 can include one or more logical volumes comprising one or more solid-state drives (e.g., flash-memory drives) and/or one or more optical disc drives in addition to or in place of one or both of disk drive array 115 and tape drive array 117. In embodiments that include more than one type of data storage device, backup server 110 (or a system including multiple instances of backup server 110) is herein referred to as a heterogeneous backup system. In embodiments that include only one type of data storage device (e.g., only one of disk drive array 115 and tape drive array 117), backup server 110 (or a system including multiple instances of backup server 110) is herein referred to as a homogenous backup system.

Figure 2:
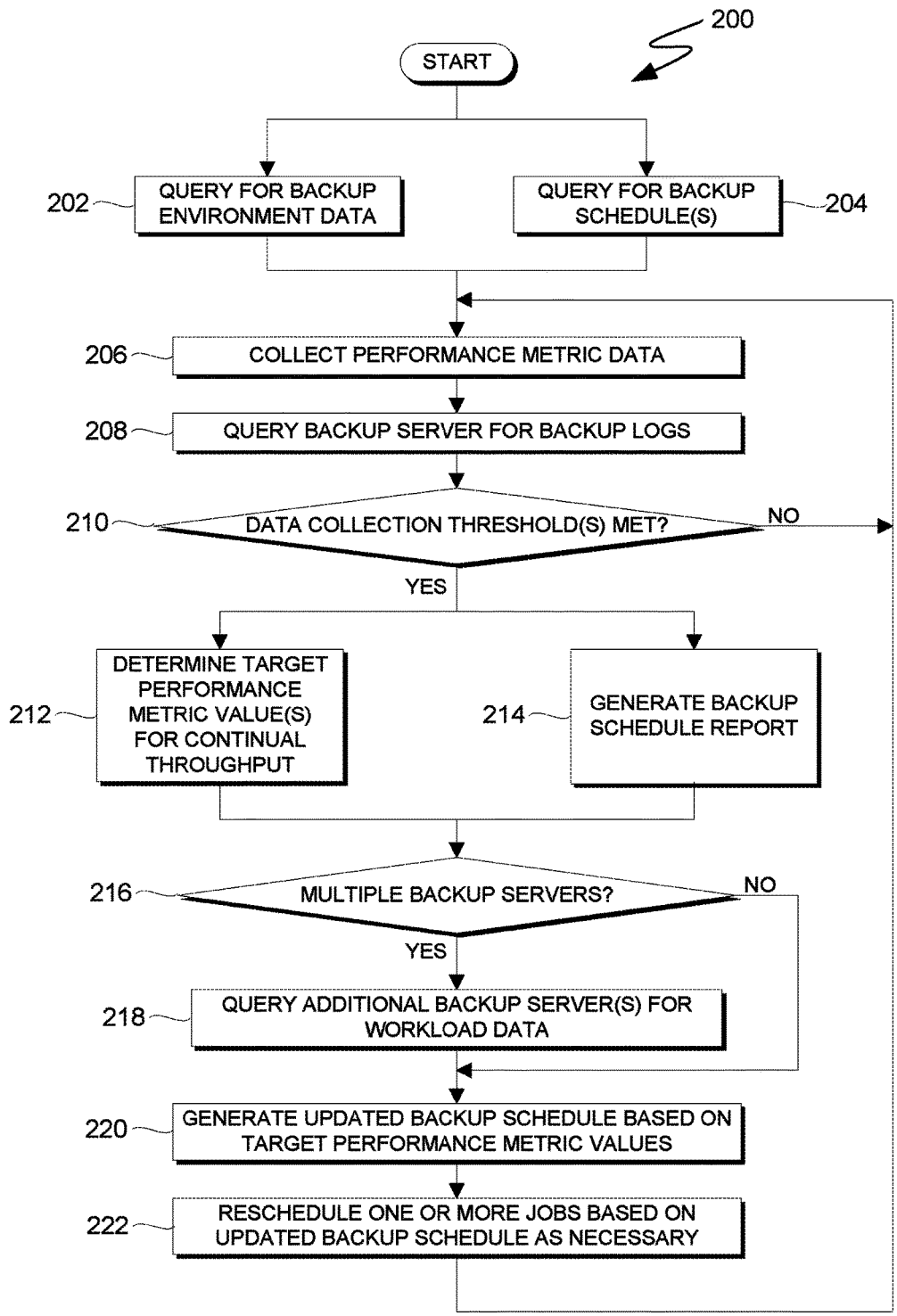
FIG. 2 is a flowchart depicting operations for optimizing data backup schedules, on a computing device within the backup environment of FIG. 1, in accordance with an embodiment of the present invention.

FIG. 2 is a flowchart depicting operations for optimizing data backup schedules, on a computing device within the backup environment of FIG. 1, in accordance with an embodiment of the present invention. For example, FIG. 2 is a flowchart depicting operations 200 of backup schedule optimization logic 113 on backup server 110 within backup environment 100.

In operation 202, backup schedule optimization logic 113 queries for, and receives, backup environment data. In some embodiments, operation 202 includes presenting a dialogue on user interface 127 of console 125 to obtain information from a user of console 125 (e.g., a backup system administrator tasked with managing one or more instances of backup server 110). In other embodiments, operation 202 includes querying a data repository of backup server 110 for setup or initialization information associated with backup server 110. The backup environment data obtained via operation 202 can include any combination of: a length of a backup window, a start time of the backup window, an end time of the backup window, time periods in which full backups are permitted, a count of backup servers (wherein one or more backup servers can function as respective backup clients for other backup servers) within backup environment 100, information for identifying the backup servers in backup environment 100, count(s) of data storage devices (e.g., a count of disk drives associated with disk drive array 115 and a count of tape drives associated with tape drive array 117), storage capacities of data storage devices in backup environment 100, threshold count(s) of data storage devices associated with respective client devices of client devices 105 (e.g., a maximum count of data storage devices on which data from client device 105A can be stored), or another type of backup environment data. In some embodiments, operation 202 is executed with respect to each backup server in backup environment 100 (i.e., each instance of backup server 110).

In operation 204, backup schedule optimization logic 113 queries for, and receives, one or more backup schedules. In some embodiments, operation 204 includes presenting a dialogue on user interface 127 of console 125 to obtain information from the user of console 125. In other embodiments, operation 204 includes querying a data repository of backup server 110 for setup or initialization information associated with backup server 110. The backup schedule(s) can include any combination of: a schedule name, job names, scheduled start times of respective jobs, and clients associated with respective jobs. In some embodiments, backup schedule optimization logic 113 also queries for, and receives, information relating to various administrative processes on backup server 110 in operation 204 to account for such administrative processes when rescheduling jobs on backup server 110, as described herein. In some embodiments, operation 204 is executed with respect to each backup server in backup environment 100 (i.e., each instance of backup server 110). In general, operation 202 and 204 can occur in parallel or in any sequence.

In operation 206, backup schedule optimization logic 113 queries for, and/or interfaces with backup server 110 to collect, performance metric data associated with various components of backup server 110. In the embodiment depicted in FIG. 1, for example, the performance metric data can include any combination of information relating to: I/O operations over network 120, I/O operations associated with disk drive array 115, I/O operations associated with tape drive array 117, processor utilization on backup server 110, and memory utilization on backup server 110. The performance metric data advantageously includes values for the various metrics at intervals of time (e.g., regular intervals of time). In some embodiments, for example, backup schedule optimization logic 113 collects performance metric data in five-minute intervals over each backup window on backup server 110. In some embodiments, operation 206 is executed with respect to each backup server in backup environment 100 (i.e., each instance of backup server 110).

In operation 208, backup schedule optimization logic 113 queries backup server 110 for, and receives, backup logs for one or more previous backup windows. Backup schedule optimization logic 113 can, in various embodiments, be configured to execute operation 208 after each backup window, after a predefined count of backup windows, and/or at the request of a user of console 125 (e.g., a backup system administrator tasked with managing one or more instances of backup server 110). The backup logs can include information relating to any combination of: a count of clients submitting jobs during the backup window, actual start times of respective jobs, actual end times of respective jobs, durations of respective jobs, sizes of respective jobs (i.e., quantities of data), destinations of respective jobs (e.g., whether jobs were respectively backed up to disk drive array 115 or tape drive array 117), initiation methods of respective jobs (i.e., whether jobs were respectively scheduled or initiated by a client on an ad hoc basis), data types of respective jobs (e.g., whether jobs were respectively associated with operating systems, databases, or files), and types of respective jobs (i.e., whether jobs were respectively incremental backups or full backups). In some embodiments, operation 208 is executed with respect to each backup server in backup environment 100 (i.e., each instance of backup server 110).

In decision 210, backup schedule optimization logic 113 determines whether or not a data collection threshold is met. In the embodiment depicted in FIG. 2, operations 200 of backup schedule optimization logic 113 advantageously includes decision 210 to prevent brief periods of anomalous utilization of backup server 110 from resulting in unwarranted changes to the backup schedule(s). For example, persons of ordinary skill in the art will understand that the occurrence of client-initiated backups is generally unpredictable based on relatively short time scales (e.g., ten or fewer backup windows). Accordingly, various embodiments of the present invention include at least one minimum data collection threshold to, at least in part, increase the likelihood that backup schedule optimization logic 113 reschedules, and/or provides recommendations to reschedule, jobs based on data associated with a statistically significant count of backup windows. In some embodiments, for example, backup schedule optimization logic 113 determines that the data collection threshold is met (decision 210, YES branch), if backup schedule optimization logic 113 can access backup logs and performance metric data for at least thirty previous backup windows; and backup schedule optimization logic determines that the data collection threshold is not met, if backup schedule optimization logic 113 can access backup logs and performance metric data for less than thirty previous backup windows (decision 210, NO branch). In some embodiments, backup schedule optimization logic 113 includes a first data collection threshold for a first iteration of decision 210 and a second, lower data collection threshold for a second (i.e., subsequent) iteration of decision 210 (i.e., an iteration of decision 210 executed after collecting performance metric data that is representative of an updated backup schedule including one or more rescheduled jobs). Determining that the data collection threshold is not met (decision 210, NO branch) causes backup schedule optimization logic 113 to execute operations 206 and 208 to collect performance metric data and backup logs for additional backup window(s). Determining that the data collection threshold is met (decision 210, YES branch) causes backup schedule optimization logic 113 to execute subsequent operations, such as one or both of operations 212 and 214. In some embodiments, decision 210 is executed with respect to each backup server in backup environment 100 (i.e., each instance of backup server 110).

In operation 212, backup schedule optimization logic 113 determines target performance metric values for continual throughout during backup windows on backup server 110. More specifically, backup schedule optimization logic 113 analyzes the performance metric data collected in operation 206 to determine at least one target performance metric that is associated with a state of "continual throughput" on one or more instances of backup server 110. For example, in a first type of embodiment, a target average I/O rate that defines continual throughput is based only on average I/O rate(s) of disk drive array 115 and tape drive array 117. Persons of ordinary skill in the art will understand that it is not always possible to maintain a constant average I/O rate during a backup window with respect to I/Os on computer data storage device array(s). Accordingly, the target average I/O rate can be associated with maximum and/or minimum average I/O thresholds such that backup server 110 is in a state of "continual throughput" if a correlated I/O rate during the backup window does not exceed the maximum average I/O threshold and/or deceed (i.e., fall below) the minimum average I/O threshold. In some embodiments, the maximum and minimum average I/O thresholds are respectively maximum and minimum I/O rates identified during operation 206 for the computer data storage devices of backup server 110. And in various embodiments of the first type of embodiment, additional thresholds are associated with performance metric values of other components of backup server 110 (e.g., one or more processors, memories, or network adapters) such that respective, measured metrics cannot exceed the maximum threshold(s) and/or deceed the minimum threshold(s) during a state of "continual throughput." In a second type of embodiment, the target average I/O rate is based on a weighted average including average I/O rate(s) of disk drive array 115 and tape drive array 117, for example, and one more average performance metric values of other components of backup server 110. In embodiments of the second type, weighting coefficients for constituent variables can be selected such that weighting coefficients associated with the average I/O rate(s) of disk drive array 115 and tape drive array 117 (or any other type or combination of computer data storage device(s) of backup server 110) have values at least one order of magnitude greater than weighting coefficients associated with other components of backup server 110 (i.e., the target average I/O rate is primarily based on average I/O rate(s) associated with the computer data storage device(s) of backup server 110).

In operation 214, backup schedule optimization logic 113 generates a backup schedule report. In various embodiments, backup schedule optimization logic 113 generates a backup schedule report for each backup window after the data collection threshold has been met (e.g., after thirty previous backup windows). An example of a backup schedule report that depicts a non-optimized backup schedule is discussed with respect to FIG. 3B. An example of a backup schedule report that depicts an optimized backup schedule is discussed with respect to FIG. 3C. Additionally, some embodiments of backup schedule optimization logic 113 have the ability to compare backup schedule reports over time (i.e., across multiple backup windows) to enable backup schedule optimization logic 113 to extrapolate, by various methods known in the art, future growth patterns for the quantity of data client devices 105 back up to backup server 110. This ability enables embodiments of backup schedule optimization logic 113 to provide alerts via user interface 127 of console 125 based on forecasts identifying when additional storage capacity will be required (e.g., when disk drive array 115 and/or tape drive array 117 will require additional computer data storage devices and/or when backup environment 100 will require additional backup servers). In some embodiments, the generated backup schedule report also distinguishes scheduled jobs from client-initiated (i.e., ad hoc) jobs.

In decision 216, backup schedule optimization logic 113 determines whether or not multiple backup servers (i.e., multiple instances of backup server 110) exist in backup environment 100. In some embodiments, decision 216 is omitted based on information obtained in response to operation 202, and backup schedule optimization logic 113 subsequently executes operation 218 or operation 220 based on the obtained information (i.e., backup schedule optimization logic 113 executes one of two versions of operations 200 that respectively represent logic corresponding to the YES and NO branches of decision 216). If backup schedule optimization logic 113 determines that multiple backup servers (i.e., backup servers that can function as backup clients) exist in backup environment 100 (decision 216, YES branch), backup schedule optimization logic 113 queries one or more other backup servers (i.e., one or more instances of backup server 110) for respective workload data (e.g., data including data generated via operations 202, 206, 212, and 214 on other backup servers; operation 218) and/or to determine if any backup servers can variously on-load or off-load jobs to optimize the respective backup schedules and achieve more continual throughput (i.e., an "average I/O rate" that is closer to the correlated target average I/O rate) on a plurality of backup servers of backup environment 100. If backup schedule optimization logic 113 determines that multiple backup servers do not exist in backup environment 100 (decision 216, NO branch), backup schedule optimization logic 113 executes operation 220.

In operation 220, backup schedule optimization logic 113 generates an updated backup schedule based on the determined target performance metric value(s) and the generated backup schedule report. More specifically, backup schedule optimization logic 113 analyzes the generated backup schedule report to identify any time periods of over-utilization or under-utilization on backup server 110 based on the target performance metric value(s) and determines if any jobs can be rescheduled to reduce the severity and/or number of periods of over-utilization and/or under-utilization to achieve more continual throughput throughout the backup window. In some embodiments, for example, backup schedule optimization logic 113 identifies one or more jobs for rescheduling if an average I/O rate at a time while the jobs are executing, and that is associated with disk drive array 115 and tape drive array 117, exceeds a maximum average I/O threshold (i.e., a period of over-utilization) and/or deceeds a minimum average I/O threshold (i.e., a period of under-utilization). For example, backup schedule optimization logic 113 can identify a job executing during a period of over-utilization and reschedule the job such that the job executes, at least in part, during a period of lower utilization, or more advantageously, a period of under-utilization. The average I/O rate is an average in the sense that it can be an average of I/O rates at the same time in a backup window over a count of backup windows (e.g., count of backup windows that is equal to an applicable data collection threshold). In embodiments that include multiple backup servers, backup schedule optimization logic 113 can similarly and advantageously off-load one or more jobs executing during a period over-utilization on a first backup server to a second backup server (i.e., a backup client) experiencing one or more periods of under-utilization based on workload data received from the second backup server and any backup schedule reports and/or target performance metric values that were received from the second backup server or determined for the second backup server.

Additionally, various embodiments of backup schedule optimization logic 113 identify jobs for rescheduling based on respective job sizes (e.g., quantities of data to be backed up or predicted duration) and respective start times such that a job having a risk of exceeding the backup window that exceeds a risk threshold window (e.g., associated with a probability value based on a comparatively large job size, a comparatively late start time, and/or a target storage location that is an over-utilized array of computer data storage devices) will be rescheduled such that the job is scheduled to start at an earlier time in the backup window. Conversely, a job having a low risk of exceeding the backup window can be rescheduled to start later in the backup window (e.g., a job of comparatively small size and/or having a target storage location that is an under-utilized array of computer data storage devices) can be rescheduled to start later in the backup window (e.g., after larger job(s)). In some embodiments, a job having a risk of exceeding the backup window that exceeds the risk threshold can be backed up to an array of computer data storage devices having better I/O performance (e.g., backed up to an array of solid-state drives instead of an array of hard disk drives) in addition to or instead of being rescheduled to an earlier time in the back window. An example of a backup schedule report that depicts an optimized backup schedule is discussed with respect to FIG. 3C. Comparing the backup schedule reports depicted in FIGS. 3B and 3C shows that rescheduling jobs to achieve more continual throughput significantly reduces the maximum number of jobs executing at any one time and results in jobs initiating at smaller, more regular intervals over the backup window.

In various embodiments, backup schedule optimization logic 113 generates the updated backup schedule based on additional factors. In some embodiments, for example, backup schedules cannot be generated such that backup server 110 utilizes, at any one time, more than a threshold number or percentage of computer data storage devices of any one type in order to account for hardware failures and restorations of client data on client devices 105 (e.g., sixty percent of tape drives in tape drive array 117). In embodiments that include multiple backup servers in backup environment 100, backup schedule optimization logic 113 can also off-load and on-load jobs with respect to various backup servers based on data received as a result of operation 218 in order to achieve more continual throughput on two or more backup servers in backup environment 100.

In operation 222, backup schedule optimization logic 113 reschedules one or more jobs based on the updated backup schedule if any jobs where identified for rescheduling in operation 220. In some embodiments, backup schedule optimization logic 113 reschedules the jobs based on an approval of respective recommendation(s) presented on user interface 127 of console 125 (i.e., based on the approval of a user of console 125, such as a backup system administrator tasked with managing one or more instances of backup server 110). In other embodiments, backup schedule optimization logic 113 automatically reschedules jobs without human approval. In yet other embodiments, whether backup schedule optimization logic 113 reschedules jobs in response to human approval or reschedules jobs automatically is a user-configurable setting of backup schedule optimization logic 113. If backup schedule optimization logic 113 does not identify any jobs for rescheduling in operation 220, backup schedule optimization logic 113 proceeds to execute operation 206 for a subsequent backup window. In the embodiment depicted in FIG. 2, backup schedule optimization logic 113 continuously executes operations 206, 208, 212, 214, 216, 218, 220, and 222 and decisions 210 and 216, as described herein, for subsequent backup windows until backup schedule optimization logic 113 is terminated or changes in backup environment 100 require that backup schedule optimization logic 113 execute, at least in part, a new iteration of operations 200 (e.g., a backup server is added or removed from backup environment 100, requiring an update to the backup environment data).

Figure 3A:
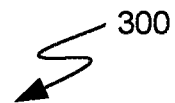
FIG. 3A depicts an example of a non-optimized backup schedule, in accordance with an embodiment of the present invention.
Figure 3B:
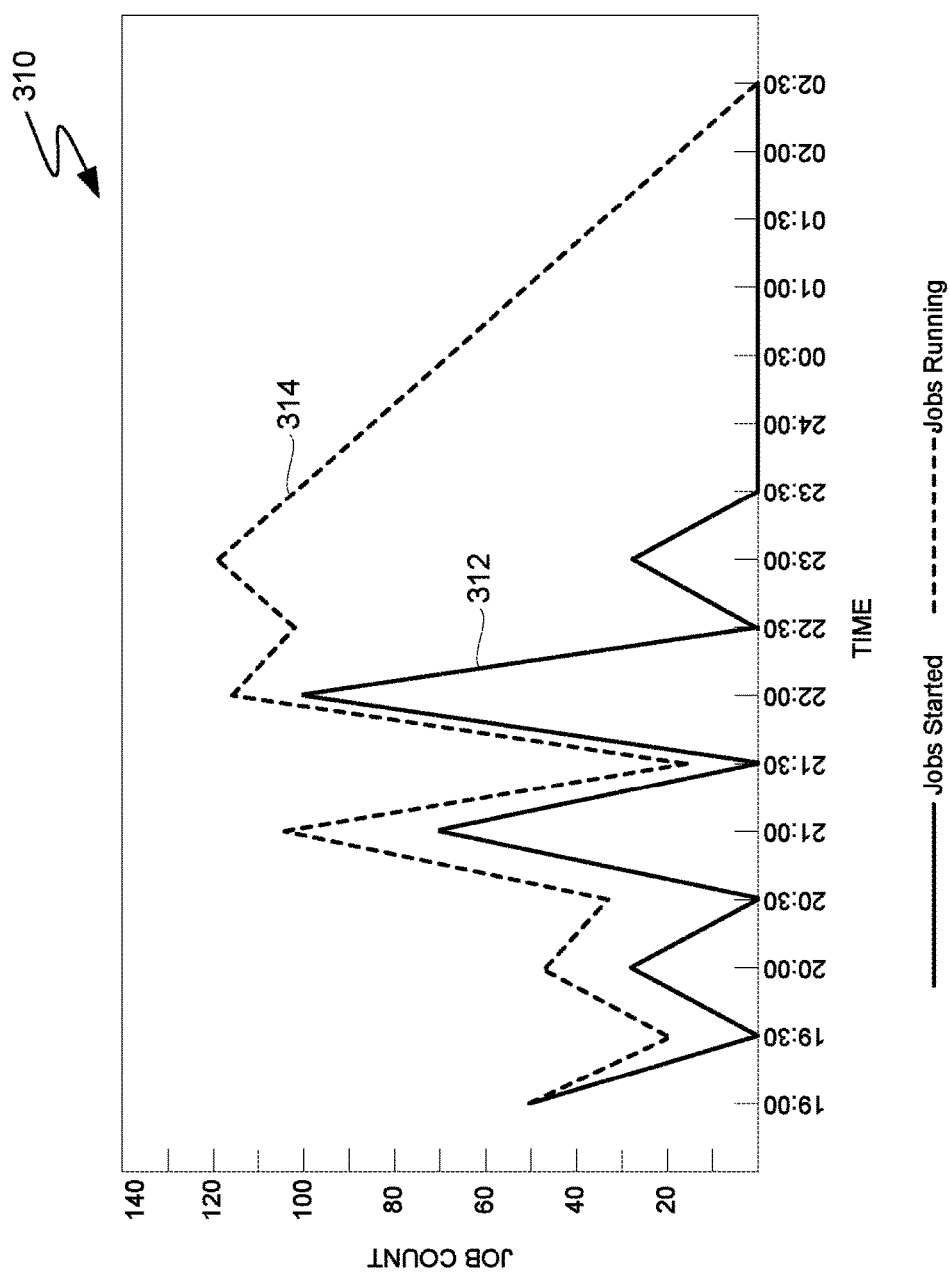
FIG. 3B depicts an example of a chart that represents a non-optimized workload on a backup server as a result of implementing the non-optimized backup schedule depicted in FIG. 3A, in accordance with an embodiment of the present invention.
Figure 3C:
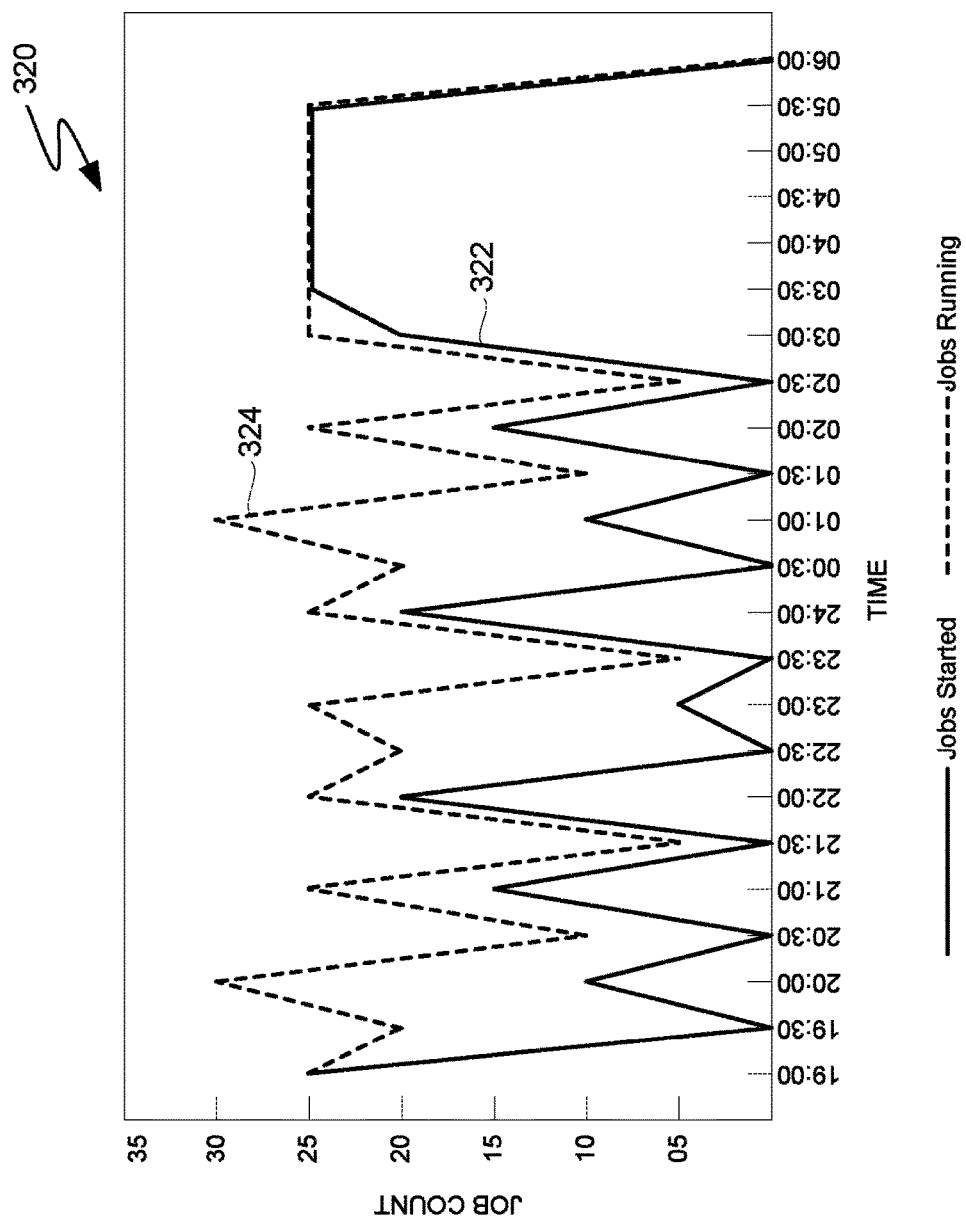
FIG. 3C depicts an example of a chart that represents an optimized workload on the backup server associated with FIG. 3B as a result of implementing an optimized version of the backup schedule depicted in FIG. 3A, in accordance with an embodiment of the present invention.

FIG. 3A depicts an example of a non-optimized backup schedule, in accordance with an embodiment of the present invention. For example, schedule 300 is representative of a schedule for backup jobs submitted by client devices 105 to backup server 110 within backup environment 100. Schedule 300 indicates that, throughout the backup window, various jobs overlap. For example, a count of running jobs at 21:00 spikes from 33 jobs running to 103 jobs running and a count of running jobs at 22:00 spikes from 16 jobs running to 102 jobs running. Persons of ordinary skill in the art will understand that such spikes can disadvantageously cause bottlenecks with respect to various components of backup server 110 and that initiating a large count of jobs in later portions of a backup window disadvantageously risks causing jobs to exceed the backup window.

FIG. 3B depicts an example of a chart that represents a non-optimized workload on a backup server as a result of implementing the non-optimized backup schedule depicted in FIG. 3A, in accordance with an embodiment of the present invention. Chart 310 includes curve 312 and curve 314. Curve 312 represents a count of jobs starting (i.e., initiating) at thirty-minute intervals during the backup window of backup server 110 and curve 314 represents a count of jobs running at thirty-minute intervals during the backup window of backup server 110. Chart 310 visually illustrates the spikes in running jobs at 21:00 and 22:00, as discussed with respect to FIG. 3A, and reflects under-utilization of backup server 110 during early portions of the backup window and over-utilization of backup server 110 during later portions of the backup window.

FIG. 3C depicts an example of a chart that represents an optimized workload on the backup server associated with FIG. 3B as a result of implementing an optimized version of the backup schedule depicted in FIG. 3A, in accordance with an embodiment of the present invention. Chart 320 includes curve 322 and curve 324 Like curves 312 and 314 of FIG. 3B, curve 322 represents a count of jobs starting (i.e., initiating) at thirty-minute intervals during the backup window of backup server 110, and curve 324 represents a count of jobs running at thirty-minute intervals during the backup window of backup server 110. Compared to chart 310, chart 320 visually illustrates a more optimized workload having more continual throughput on backup server 110. For example, compared to curve 312, curve 322 indicates that smaller counts of jobs start (i.e., initiate) at smaller, more regular intervals throughout the backup window. Similarly, compared to curve 314, curve 324 indicates that smaller counts of jobs advantageously run at each interval and that the spikes in running jobs are advantageously smaller throughout the backup window.

Figure 4:
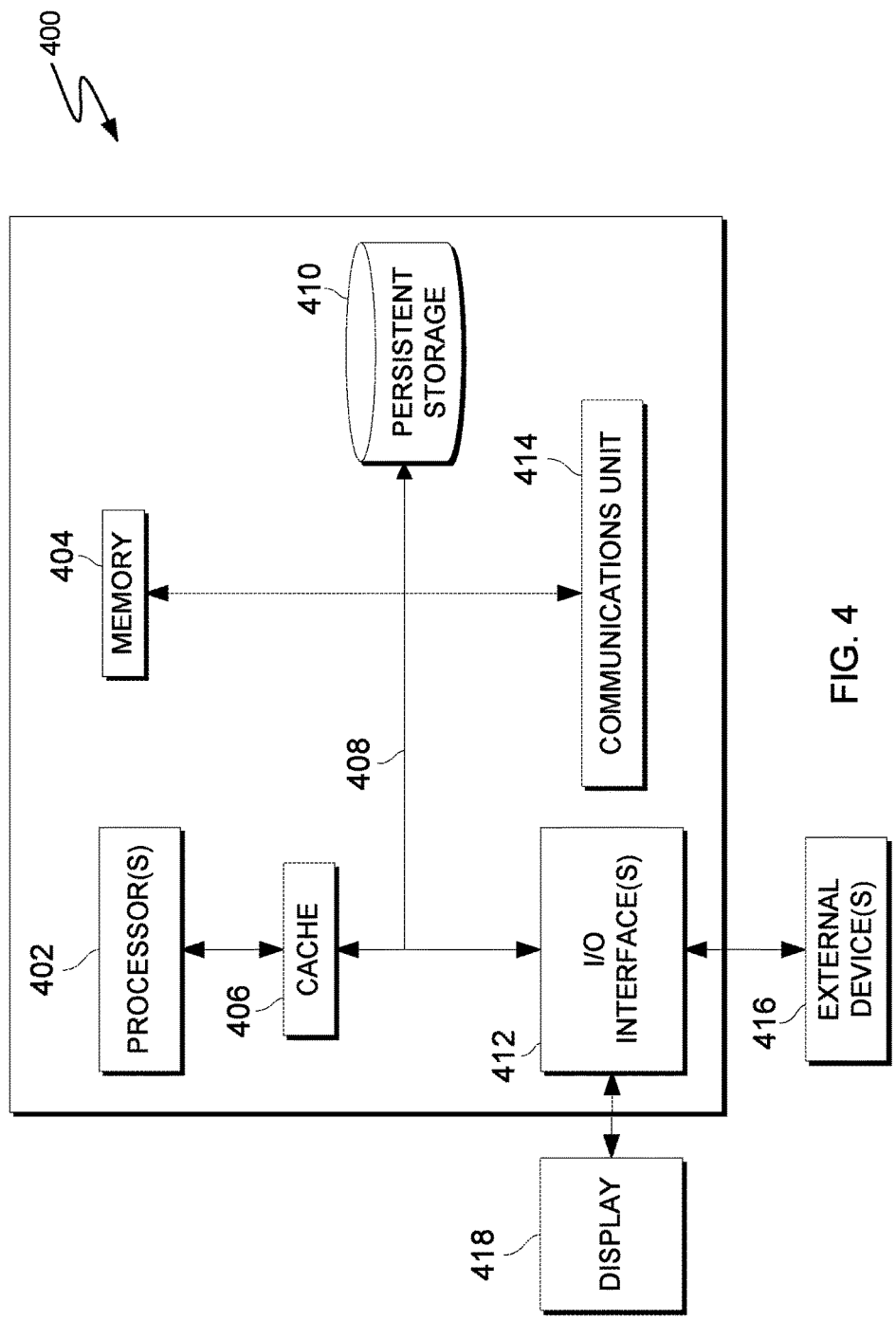
FIG. 4 is a block diagram of components of a computing device executing operations for optimizing data backup schedules, in accordance with an embodiment of the present invention.

FIG. 4 is a block diagram of components of a computing device executing operations for optimizing data backup schedules, in accordance with an embodiment of the present invention. In one embodiment, computing system 400 is representative of one or more of client device 105A, client device 105B, client device 105C, backup server 110, and console 125 within backup environment 100, in which case backup server 110 includes backup schedule optimization logic 113 and console 125 includes user interface 127.

It should be appreciated that FIG. 4 provides only an illustration of one implementation and does not imply any limitations with regard to the environments in which different embodiments may be implemented. Many modifications to the depicted environment may be made.

Computing system 400 includes processor(s) 402, cache 406, memory 404, persistent storage 410, input/output (I/O) interface(s) 412, communications unit 414, and communications fabric 408. Communications fabric 408 provides communications between cache 406, memory 404, persistent storage 410, communications unit 414, and input/output (I/O) interface(s) 412. Communications fabric 408 can be implemented with any architecture designed for passing data and/or control information between processors (such as microprocessors, communications and network processors, etc.), system memory, peripheral devices, and any other hardware components within a system. For example, communications fabric 408 can be implemented with one or more buses or a crossbar switch.

Memory 404 and persistent storage 410 are computer readable storage media. In this embodiment, memory 404 includes random access memory (RAM). In general, memory 404 can include any suitable volatile or non-volatile computer readable storage media. Cache 406 is a fast memory that enhances the performance of processor(s) 402 by holding recently accessed data, and data near recently accessed data, from memory 404.

Program instructions and data used to practice embodiments of the present invention may be stored in persistent storage 410 and in memory 404 for execution by one or more of the respective processor(s) 402 via cache 406. In an embodiment, persistent storage 410 includes a magnetic hard disk drive. Alternatively, or in addition to a magnetic hard disk drive, persistent storage 410 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 410 may also be removable. For example, a removable hard drive may be used for persistent storage 410. Other examples include optical and magnetic disks, thumb drives, and smart cards that are inserted into a drive for transfer onto another computer readable storage medium that is also part of persistent storage 410.

Communications unit 414, in these examples, provides for communications with other data processing systems or devices. In these examples, communications unit 414 includes one or more network interface cards. Communications unit 414 may provide communications through the use of either or both physical and wireless communications links. Program instructions and data used to practice embodiments of the present invention may be downloaded to persistent storage 410 through communications unit 414.

I/O interface(s) 412 allows for input and output of data with other devices that may be connected to computing system 400. For example, I/O interface(s) 412 may provide a connection to external device(s) 416 such as a keyboard, keypad, a touch screen, and/or some other suitable input device. External device(s) 416 can also include portable computer readable storage media such as, for example, thumb drives, portable optical or magnetic disks, and memory cards. Software and data used to practice embodiments of the present invention can be stored on such portable computer readable storage media and can be loaded onto persistent storage 410 via I/O interface(s) 412. I/O interface(s) 412 also connect to display 418.

Display 418 provides a mechanism to display or present data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, a list of alternatives such as "at least one of A, B, and C" should be interpreted to mean "at least one A, at least one B, at least one C, or any combination of A, B, and C."

Additionally, the phrase "based on" should be interpreted to mean "based, at least in part, on."

The term "exemplary" means of or relating to an example and should not be construed to indicate that any particular embodiment is preferred relative to any other embodiment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for optimizing data backup schedules, comprising:
    identifying, by one or more computer processors, backup environment data;
    identifying, by one or more computer processors, data describing a first backup schedule;
    collecting, by one or more computer processors, performance metric data that includes performance metric data of a data storage array of one or more computer data storage devices of a first backup server;
    identifying, by one or more computer processors, data describing one or more backup logs that are associated with a plurality of jobs that were backed up to the data storage array and respectively executed during one or more backup windows;
    in response to determining, by one or more computer processors, that a count of backup windows associated with the data describing the one or more backup jobs meets or exceeds a data collection threshold:
        determining, by one or more computer processors, a target average I/O rate based, at least in part, on the performance metric data of the data storage array; and
        determining, by one or more computer processors, a maximum average I/O threshold and a minimum average I/O threshold based on the target average I/O rate; and
    generating, by one or more computer processors, a second backup schedule based, at least in part, on the target average I/O rate, one or more average I/O rates of the data storage array, the backup environment data, and the data describing the one or more backup logs such that a start time of a first job of the plurality of jobs in the second backup schedule is scheduled for a different time in a backup window compared to a start time of the first job in the first backup schedule, wherein generating the second backup schedule further comprises:
        determining, by one or more computer processors, that a first average I/O rate of the one or more average I/O rates of the data storage array exceeded the maximum average I/O threshold while the first job was executing;
        identifying, by one or more computer processors, a time at which a second average I/O rate of the one or more average I/O rates of the data storage array deceeded the minimum average I/O threshold; and
        scheduling, by one or more computer processors, the start time of the first job in the second backup schedule such that the first job will be executing at the time at which the second I/O rate deceeded the minimum average I/O.

2. The method of claim 1, wherein the data collection threshold is a count of thirty backup logs.

3. The method of claim 1, wherein:
    the performance metric data includes performance metric data for one or more computer processors of the first backup server, performance metric data for one or more memories of the first backup server, and performance metric data for one or more network adapters of the first backup server; and
    the target average I/O rate is based, at least in part, on the performance metric data for the one or more computer processors of the first backup server, the performance metric data for one or more memories of the first backup server, and the performance metric data for one or more network adapters of the first backup server.

4. The method of claim 3, wherein the target average I/O rate is a weighted average including respective weighting coefficients for the performance metric data of the data storage array, the performance metric data for the one or more computer processors of the first backup server, the performance metric data for one or more memories of the first backup server, and the performance metric data for one or more network adapters of the first backup server.

5. The method of claim 1, further comprising:
receiving from a second backup server, by one or more computer processors, workload data of the second backup server;
determining, by one or more computer processors, a maximum average I/O threshold of the first backup server based on the target average I/O rate of the first backup server;
determining, by one or more computer processors, a target average I/O rate of the second backup server based, at least in part, on the workload data of the second backup server;
determining, by one or more computer processors, a minimum average I/O threshold of the second backup server based on the determined target average I/O rate of the second backup server; and
wherein generating, by one or more computer processors, the second backup schedule further comprises:
determining, by one or more computer processors, that an average I/O rate of one or more average I/O rates of the data storage array of the first backup server exceeded the maximum average I/O threshold of the first backup server while a second job was executing; and
identifying, by one or more computer processors, a time at which an average I/O rate of one or more average I/O rates of a data storage array of the second backup server deceeded the minimum average I/O threshold of the second backup server, and in response:
off-loading, by one or more computer processors, the second job to the second backup server; and
omitting, by one or more computer processors, the second job from the second backup schedule.

6. A computer program product for optimizing data backup schedules, the computer program product comprising:
a computer readable storage medium and program instructions stored on the computer readable storage medium, the program instructions comprising:
program instructions to identify backup environment data;
program instructions to identify data describing a first backup schedule;
program instructions to collect performance metric data that includes performance metric data of a data storage array of one or more computer data storage devices of a first backup server;
program instructions to identify data describing one or more backup logs that are associated with a plurality of jobs that were backed up to the data storage array and respectively executed during one or more backup windows;
program instruction to, in response to determining that a count of backup windows associated with the data describing the one or more backup jobs meets or exceeds a data collection threshold, execute program instructions to:
determine a target average I/O rate based, at least in part, on the performance metric data of the data storage array; and
determine, a maximum average I/O threshold and a minimum average I/O threshold based on the target average I/O rate; and program instructions to generate a second backup schedule based, at least in part, on the target average I/O rate, one or more average I/O rates of the data storage array, the backup environment data, and the data describing the one or more backup logs such that a start time of a first job of the plurality of jobs in the second backup schedule is scheduled for a different time in a backup window compared to a start time of the first job in the first backup schedule, wherein the program instructions to generate the second backup schedule further comprise:
program instructions to determine that a first average I/O rate of the one or more average I/O rates of the data storage array exceeded the maximum average I/O threshold while the first job was executing;
program instructions to identify a time at which a second average I/O rate of the one or more average I/O rates of the data storage array deceeded the minimum average I/O threshold; and
program instructions to schedule the start time of the first job in the second backup schedule such that the first job will be executing at the time at which the second I/O rate deceeded the minimum average I/O.

7. The computer program product of claim 6, wherein:
the performance metric data includes performance metric data for one or more computer processors of the first backup server, performance metric data for one or more memories of the first backup server, and performance metric data for one or more network adapters of the first backup server; and
the target average I/O rate is based, at least in part, on the performance metric data for the one or more computer processors of the first backup server, the performance metric data for one or more memories of the first backup server, and the performance metric data for one or more network adapters of the first backup server.

8. The computer program product of claim 7, wherein the target average I/O rate is a weighted average including respective weighting coefficients for the performance metric data of the data storage array, the performance metric data for the one or more computer processors of the first backup server, the performance metric data for one or more memories of the first backup server, and the performance metric data for one or more network adapters of the first backup server.

9. The computer program product of claim 6, the program instructions further comprising:
program instruction to receive from a second backup server workload data of the second backup server;
program instructions to determine a maximum average I/O threshold of the first backup server based on the target average I/O rate of the first backup server;
program instructions to determine a target average I/Orate of the second backup server based, at least in part, on the workload data of the second backup server;
program instructions to determine, a minimum average I/O threshold of the second backup server based on the determined target average I/O rate of the second backup server; and
wherein the program instructions to generate the second backup schedule further comprise:
program instructions to determine that an average I/O rate of one or more average I/O rates of the data storage array of the first backup server exceeded the maximum average I/O threshold of the first backup server while a second job was executing; and program instructions to identify a time at which an average I/O rate of one or more average I/O rates of a data storage array of the second backup server deceeded the minimum average I/O threshold of the second backup server, and in response, execute program instructions to:
off-load the second job to the second backup server; and
omit the second job from the second backup schedule.

10. The computer program product of claim 6, wherein the data collection threshold is a count of thirty backup logs.

11. A computer system for optimizing data backup schedules, the computer system comprising:
one or more computer processors;
one or more computer readable storage media;
program instructions stored on the one or more computer readable storage media for execution by at least one of the one or more processors, the program instructions comprising:
program instructions to identify backup environment data;
program instructions to identify data describing a first backup schedule;
program instructions to collect performance metric data that includes performance metric data of a data storage array of one or more computer data storage devices of a first backup server;
program instructions to identify data describing one or more backup logs that are associated with a plurality of jobs that were backed up to the data storage array and respectively executed during one or more backup windows;
program instruction to, in response to determining that a count of backup windows associated with the data describing the one or more backup jobs meets or exceeds a data collection threshold, execute program instructions to:
determine a target average I/O rate based, at least in part, on the performance metric data of the data storage array; and
determine, a maximum average I/O threshold and a minimum average I/O threshold based on the target average I/O rate; and
program instructions to generate a second backup schedule based, at least in part, on the target average I/O rate, one or more average I/O rates of the data storage array, the backup environment data, and the data describing the one or more backup logs such that a start time of a first job of the plurality of jobs in the second backup schedule is scheduled for a different time in a backup window compared to a start time of the first job in the first backup schedule, wherein the program instructions to generate the second backup schedule further comprise:
program instructions to determine that a first average I/O rate of the one or more average I/O rates of the data storage array exceeded the maximum average I/O threshold while the first job was executing;
program instructions to identify a time at which a second average I/O rate of the one or more average I/O rates of the data storage array deceeded the minimum average I/O threshold; and
program instructions to schedule the start time of the first job in the second backup schedule such that the first job will be executing at the time at which the second I/O rate deceeded the minimum average I/O.

12. The computer system of claim 11, wherein the data collection threshold is a count of thirty backup logs.

13. The computer system of claim 11, wherein:
the performance metric data includes performance metric data for one or more computer processors of the first backup server, performance metric data for one or more memories of the first backup server, and performance metric data for one or more network adapters of the first backup server; and
the target average I/O rate is based, at least in part, on the performance metric data for the one or more computer processors of the first backup server, the performance metric data for one or more memories of the first backup server, and the performance metric data for one or more network adapters of the first backup server.

14. The computer system of claim 13, wherein the target average I/O rate is a weighted average including respective weighting coefficients for the performance metric data of the data storage array, the performance metric data for the one or more computer processors of the first backup server, the performance metric data for one or more memories of the first backup server, and the performance metric data for one or more network adapters of the first backup server.

15. The computer system of claim 11, the program instructions further comprising:
program instruction to receive from a second backup server workload data of the second backup server;
program instructions to determine a maximum average I/O threshold of the first backup server based on the target average I/O rate of the first backup server;
program instructions to determine a target average I/O rate of the second backup server based, at least in part, on the workload data of the second backup server;
program instructions to determine, a minimum average I/O threshold of the second backup server based on the determined target average I/O rate of the second backup server; and
wherein the program instructions to generate the second backup schedule further comprise:
program instructions to determine that an average I/O rate of one or more average I/O rates of the data storage array of the first backup server exceeded the maximum average I/O threshold of the first backup server while a second job was executing; and
program instructions to identify a time at which an average I/O rate of one or more average I/O rates of a data storage array of the second backup server deceeded the minimum average I/O threshold of the second backup server, and in response, execute program instructions to:
off-load the second job to the second backup server; and
omit the second job from the second backup schedule.

* * * * *